United States Patent
Rahmes et al.

(10) Patent No.: US 8,712,147 B2
(45) Date of Patent: Apr. 29, 2014

(54) FRACTAL METHOD FOR DETECTING AND FILLING DATA GAPS WITHIN LIDAR DATA

(75) Inventors: Mark Rahmes, Melbourne, FL (US); J. Hartan Yates, Melbourne, FL (US); Morteza Akbari, Rockledge, FL (US); Gnana Bhaskar Tenali, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 247 days.

(21) Appl. No.: 13/365,835

(22) Filed: Feb. 3, 2012

(65) Prior Publication Data

US 2013/0202193 A1 Aug. 8, 2013

(51) Int. Cl.
*G06K 9/00* (2006.01)

(52) U.S. Cl.
USPC .......................................................... 382/154

(58) Field of Classification Search
CPC .... G06T 7/0075; G06T 7/0065; G06T 7/0077
USPC .......................................................... 382/154
See application file for complete search history.

(56) References Cited

U.S. PATENT DOCUMENTS

| | | | |
|---|---|---|---|
| 4,941,193 A | 7/1990 | Barnsley et al. |
| 5,065,447 A | 11/1991 | Barnsley et al. |
| 5,384,867 A | 1/1995 | Barnsley et al. |
| 5,416,856 A | 5/1995 | Jacobs et al. |
| 5,430,812 A | 7/1995 | Barnsley et al. |

OTHER PUBLICATIONS

Castorena et al: "Using Finite Moment Rate of Innovation for LIDAR Waveform Complexity Estimation", IEEE, 2010.*

* cited by examiner

*Primary Examiner* — Ruiping Li
(74) *Attorney, Agent, or Firm* — Fox Rothschild, LLP; Robert J. Sacco; Carol Thorstad Forsyth

(57) ABSTRACT

Method for improving the quality of a set of a three dimensional (3D) point cloud data representing a physical surface by detecting and filling null spaces (606). The method includes analyzing (206) the data to identify the presence of a plurality of level 1 fractals (401), each defined by a plurality of voxels (400) containing data points arranged in one of a plurality of three-dimensional patterns. The method also includes selectively filling (212) voxels in the 3D point cloud data with a first predetermined limited number of data points to increase a number of instances where level 2 fractals (604) can be used for representing the 3D point cloud data. Each level 2 fractal is defined as a common plurality of the level 1 fractals having a common three-dimensional pattern, where the common plurality of level 1 fractals are also arranged in accordance with the common three dimensional pattern.

20 Claims, 11 Drawing Sheets

Level 1 Fractal

Level 2 Fractal

| PATTERN REFERENCE NUMBER | SUB-VOLUME NO. $302_0$ | SUB-VOLUME NO. $302_1$ | SUB-VOLUME NO. $302_2$ | SUB-VOLUME NO. $302_3$ | SUB-VOLUME NO. $302_4$ | SUB-VOLUME NO. $302_5$ | SUB-VOLUME NO. $302_6$ | SUB-VOLUME NO. $302_7$ |
|---|---|---|---|---|---|---|---|---|
| ... | ... | ... | ... | ... | ... | ... | ... | ... |
| 99 | 0 | 1 | 1 | 0 | 0 | 0 | 1 | 0 |
| 100 | 0 | 1 | 1 | 0 | 0 | 0 | 1 | 1 |
| 101 | 0 | 1 | 1 | 0 | 0 | 1 | 0 | 0 |
| ... | ... | ... | ... | ... | ... | ... | ... | ... |
| 256 | 1 | 1 | 1 | 1 | 1 | 1 | 1 | 1 |

*FIG. 8*

| LOCATION NO. | X (LAT) | Y (LON) | Z (HEIGHT) | RESOLUTION LEVEL 1 | RESOLUTION LEVEL 2 | RESOLUTION LEVEL 3 |
|---|---|---|---|---|---|---|
| 1 | 291 | 465 | 113 | 171 | | |
| 2 | 291 | 467 | 103 | 11 | | |
| 3 | 291 | 467 | 105 | 129 | | |
| 4 | 291 | 469 | 97 | 0 | 0 | 11 |
| 5 | 291 | 477 | 103 | 11 | | |
| 6 | 291 | 479 | 103 | 3 | | |

FRACTAL METHOD FOR DETECTING AND FILLING DATA GAPS WITHIN LIDAR DATA

BACKGROUND OF THE INVENTION

1. Statement of the Technical Field

The inventive arrangements relate to point cloud data, and more particularly to compression and filling of gaps in point cloud data.

2. Description of the Related Art

LiDAR is a three dimensional (3D) sensing system that can generate 3D image data. The system works by recording multiple range echoes from pulses of laser light to generate an image frame. Such data is comprised of a collection of points in three dimensions which correspond to the multiple range echoes within a sensor aperture. Data recorded by a LiDAR system is sometimes referred to as a three dimensional point cloud data. The data points in a 3D point cloud data are sometimes referred to as "voxels" which represent a data point value on a regular grid in three dimensional space. Voxels used in 3D imaging are analogous to pixels used to in the context of 2D imaging devices. In this regard, it should be understood that each data point in the 3D point cloud typically has an individual x, y and z value, such that the point cloud can represent the actual surface within a scene in 3D. Each point can also have an intensity value. With the foregoing information, LiDAR data can be processed to reconstruct a three-dimensional representation of a surface or terrain.

LiDAR data can be collected at sub-meter distances between data points. Accuracy increases with higher resolution, since more points are available to define the features to be modeled. Gaps in LiDAR data impact the quality of image products generated using such data. Gaps in LiDAR data can occur for various reasons. For example, since laser scanning requires good reflectivity at the target surface, gaps may occur due to multi-path reflections. Also, some grid posts may be recorded without heights/ranges, and areas of data gaps or voids can arise as a result. Due to these and other phenomena, existing data collections frequently tend to have voids. Data collection service providers often claim a particular point density based on number of points collected per square area. Although on average these claims are valid, the data voids or gaps can significantly degrade derived products.

SUMMARY OF THE INVENTION

The invention concerns a method for using a computer system to improve the quality of data by detecting and filling null spaces contained in a set of three dimensional (3D) point cloud data representing a physical surface. The method includes analyzing the set of 3D point cloud data to identify within the set the presence of a plurality of level 1 fractals. Each level 1 fractal is defined by a plurality of voxels containing data points arranged in one of a plurality of three-dimensional patterns. Thereafter, the voxels in the 3D point cloud data are selectively filled with a first predetermined limited number of data points to increase a number of instances where level 2 fractals can be used for representing the 3D point cloud data. Each level 2 fractal is defined as a common plurality of the level 1 fractals having a common three-dimensional pattern. In the level 2 fractal, the common plurality of level 1 fractals are also arranged in accordance with the common three dimensional pattern.

BRIEF DESCRIPTION OF THE DRAWINGS

Embodiments will be described with reference to the following drawing figures, in which like numerals represent like items throughout the figures, and in which:

FIG. 8 is a partial listing of a table that is useful for understanding how the cube in FIG. 3 can be used to specify a plurality of three-dimensional geometric patterns.

FIG. 9 is a drawing that is useful for understanding how fractals can be used in a data compression scheme to generate a look up table.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1A:
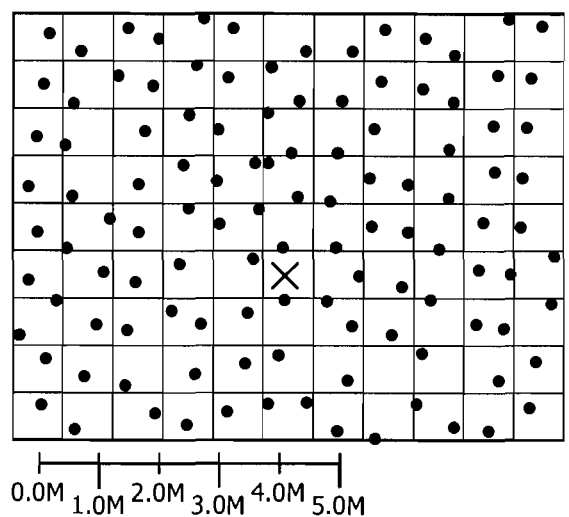
FIG. 1A shows an example of 3D point cloud data which has a desired post spacing.
Figure 1B:
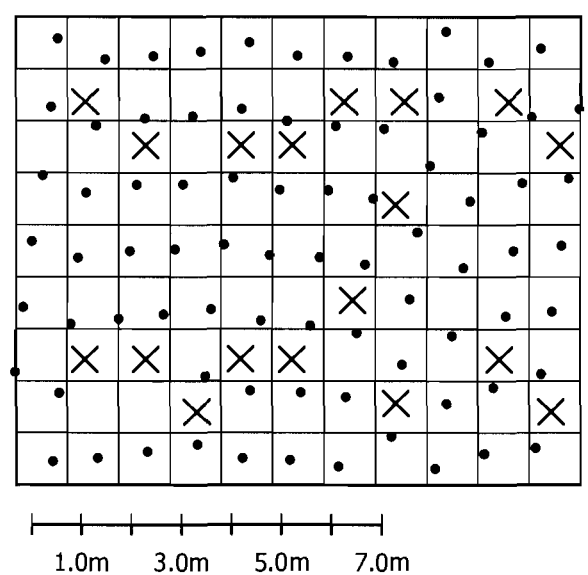
FIG. 1B shows an example of 3D point cloud data which has an undesirable post spacing.

Quality processing of LiDAR data for terrain mapping requires high density data with optimal post spacing of at least one point per square meter (1 point/$m^2$) on a regular one meter square grid. The average distance between points corresponding to this density is less than one meter. FIG. 1A shows an example of LiDAR data in which approximately 99% of the cells contain at least one LiDAR data point. It is desirable for at least 95% of the cells to contain at least one LiDAR data point. In contrast, FIG. 1B shows an example of undesired post spacing with only 77.5% of the one square meter cells containing at least one LiDAR point. It is desirable to fill in missing LiDAR data points, but it is not always apparent how such filling should be performed.

Fractals are a rough or fragmented geometric shape that can be split into parts, each of which is (at least approximately) a reduced-size copy of the whole. Fractals can be used to compress real-world data by finding self-similar features within a set of point cloud data and removing redundant ones. Fractal based data compression techniques are currently used in 2D imagery. These data compression methods are well documented and proven to work well with some satellite imagery achieving compression ratios of over 170:1. Currently LiDAR compression is conventionally performed by using wavelets and quantizing of the data. Other approaches to compression in the LiDAR domain involve collapsing the 3D data to 2D, and processing data with gaps present. These approaches applied to LiDAR data compression are effective but simply accept the (sometimes poor) quality of results using 2D interpolation and smoothing over any gaps or voids in the data. Other systems search raster data for voids and do not process data in that area. These methods lead to degraded results in the final 3D image.

The present invention overcomes the limitations of the prior art by using a fractal-based method for detecting and filling gaps in 3D point cloud data, while also facilitating compression and decompression of such data. This novel use of fractals, which is based on self-similarity, allows a cost function to be used. The voids or gaps in volumetric 3D point cloud data are filled so that the fractal self-similarity cost function is minimized. The idea is that if there is a gap and the adjacent 3D areas have a certain similar fractal pattern, then it is likely that the area including the gap in the data will have the same pattern. The gap is filled with this certain pattern if and only if there are fractal patterns of the same type (but evaluated at a lower resolution) which include the candidate fractal pattern in which the detected gap is to be filled. The data set in the neighborhood can be compressed as a result of filling the gap with that certain fractal pattern.

Once all of the gaps are filled, a lookup table is generated for the 3D point cloud data, and the data is compressed by identifying patterns within patterns of data. A higher compression is achieved when there exists the same pattern within similar patterns of multiple events. Lossless compression can be achieved by the additional inclusion of an offset value for each point using Huffman encoding. The offset value is the difference between the noise filtered data and the truncated data. Lossy compression is an option with a higher compression if it is decided to waive the offset values for each point. Decompression is efficiently accomplished by expanding the fractal data patterns back to the noise filtered x, y, z format. If an offset was used, there should be no loss of information or lossless compression.

Figure 2:
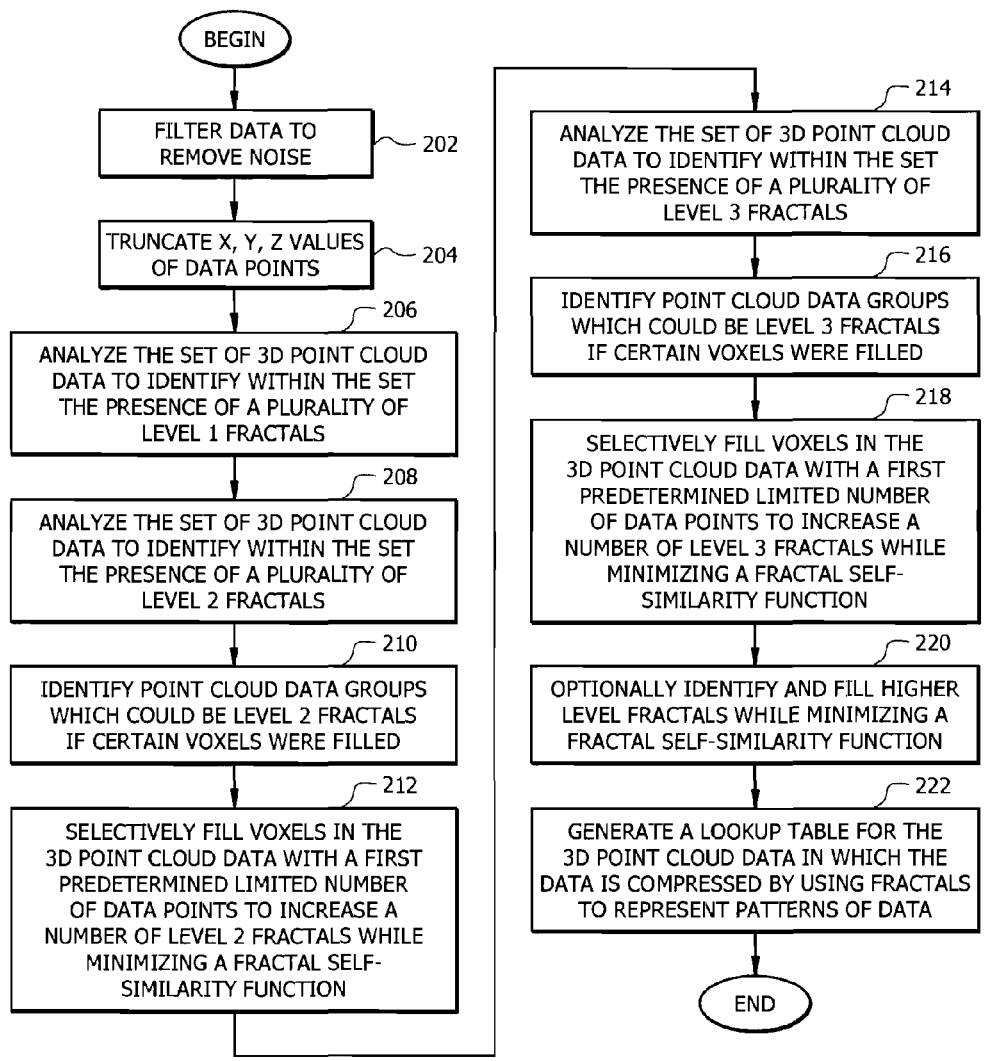
FIG. 2 is a flowchart that is useful for understanding a method for filling and compressing 3D point cloud data.

The invention will now be described in further detail with respect to the flowchart shown in FIG. 2. A process for detecting and filling gaps can begin at step 201 and continues at step 202 where a point cloud data set is filtered to remove noise and other unnecessary or unwanted data. In step 204, the x, y, and z values associated with each point within the point cloud is truncated. Truncating the data in this way facilitates the process of identifying voids or gaps as hereinafter described. In particular, the truncation serves to align the points comprising the point cloud data to a three dimensional grid of voxels. It should be noted that data of this type is now typically formatted as an output file from data collectors in a regularly spaced grid in x, y, and z dimensions, such that truncating may not be required or desired (this eliminates the need for addressing any reduced accuracy caused by truncating). The invention is a solution for post-processing of the collected data to fill in missing data while simultaneously compressing data.

Figure 3A:
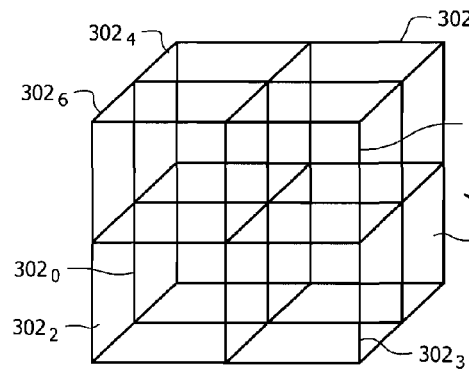
FIG. 3A is a drawing that is useful for understanding a cube formed from 8 sub-volumes that is used in the process described herein for identifying fractals.
Figure 3B:
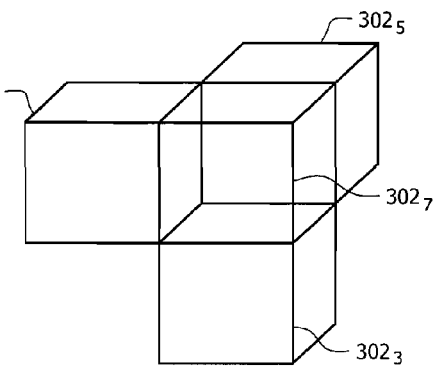
FIG. 3B is an example of one three-dimensional geometric pattern which can be defined by selecting or marking certain sub-volumes of the cube.

The process continues in step 206-208 by analyzing the set of 3D point cloud data to identify within the point cloud data a plurality fractals which are arranged in one of a plurality of three dimensional patterns. This concept is more fully explained with respect to FIGS. 3A and 3B. FIG. 3A shows a cube 300 formed from eight (8) sub-volumes $302_0$-$302_7$. arranged in a 2×2×2 formation. There are 256 possible three-dimensional geometric patterns that can be formed by choosing selected ones of the sub-volumes. In the example illustrated in FIG. 3B, sub-volumes $302_3$, $302_5$, $302_6$, and $302_7$ are selected or marked. The selection of these four sub-volumes in FIG. 3B specifies one of the 256 possible three-dimensional geometric patterns for cube 300. Each of the 256 possible patterns can be assigned a reference value. This concept is illustrated in FIG. 8 which shows a partial list of pattern reference numbers where marked sub-volumes $302_0$-$302_7$ are indicated with a value of 1 and unmarked sub-volumes are indicated with a value of zero. The cube 300 can effectively be scanned through an entire frame of 3D point cloud data to identify the presence of fractals contained therein. This scanning process is preferably performed at two or more levels of resolution as hereinafter described with respect to FIGS. 4-6.

Figure 4A:
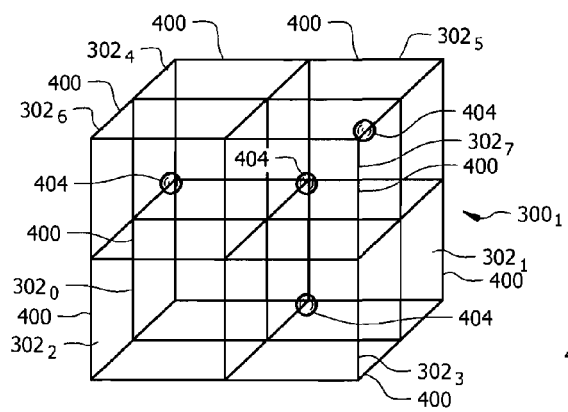
FIG. 4A is a drawing that is useful for understanding how the cube in FIG. 3 can be used for identifying certain geometric patterns at a first level of resolution.
Figure 4B:
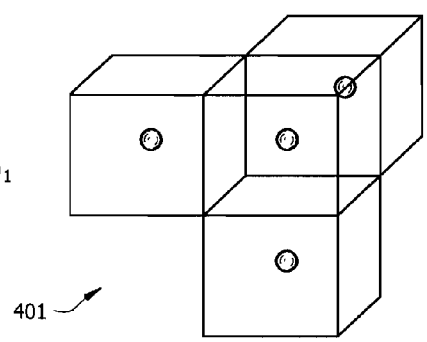
FIG. 4B is a drawing that is useful for understanding the concept of a level 1 fractal.

At step 206, the point cloud data is analyzed at a first level of resolution for purposes of identifying level 1 fractals. At the first level of resolution, each sub-volume $302_0$-$302_7$ of a cube 300 can correspond to a single voxel 400. This scenario is illustrated in FIG. 4A, in which each sub-volume $302_0$-$302_7$ of a cube $300_1$ is the same size as a single voxel 400. A particular sub-volume is marked or selected when a data point 404 appears within the particular sub-volume (voxel). The cube $300_1$ is scanned through the entire set of 3D point cloud data so that a all of the data is evaluated in this way. At this first level of resolution, each of the 256 three-dimensional geometric patterns is determined directly by the arrangement of the data points 404 within the cube 300 as it is scanned through the 3D point cloud. With the foregoing scheme, the particular sub-volumes which are "marked" by the presence of a data points 404 will designate one of the 256 three-dimensional geometric patterns. In the example shown in FIG. 4A, the data points 404 reside in voxels 400 which correspond to sub-volumes $302_3$, $302_5$, $302_6$, and $302_7$, thereby resulting in the fractal 401 shown in FIG. 4B. The fractals that are identified at this first level of resolution are referred to herein as level 1 fractals.

Figure 5A:
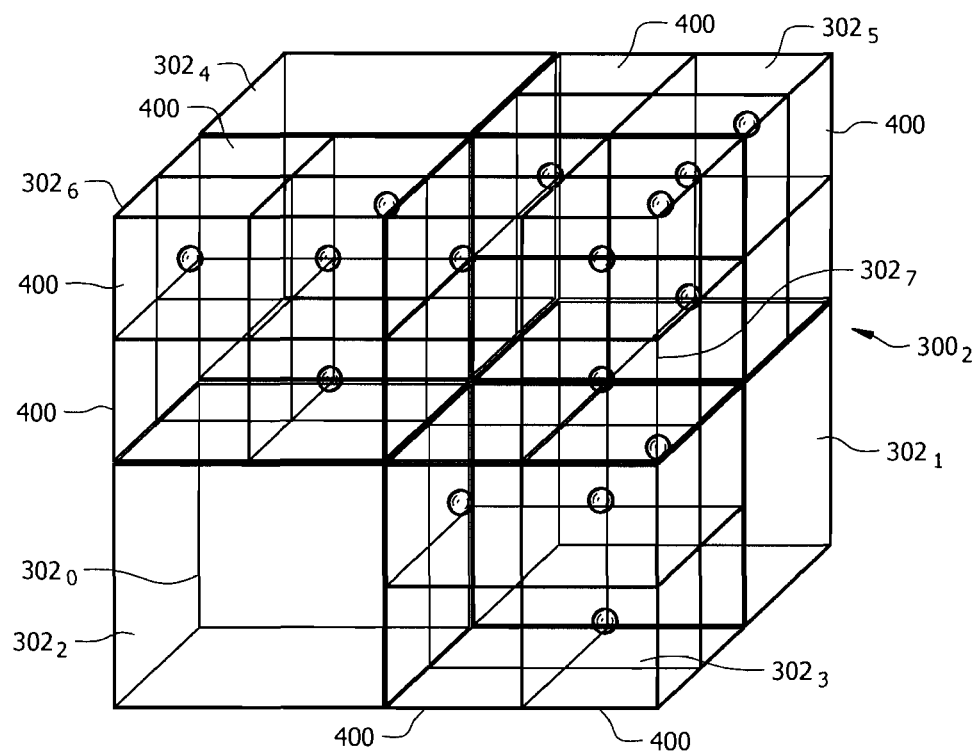
FIG. 5A is a drawing that is useful for understanding how the cube in FIG. 3 can be used for identifying certain geometric patterns at a second level of resolution.
Figure 5B:
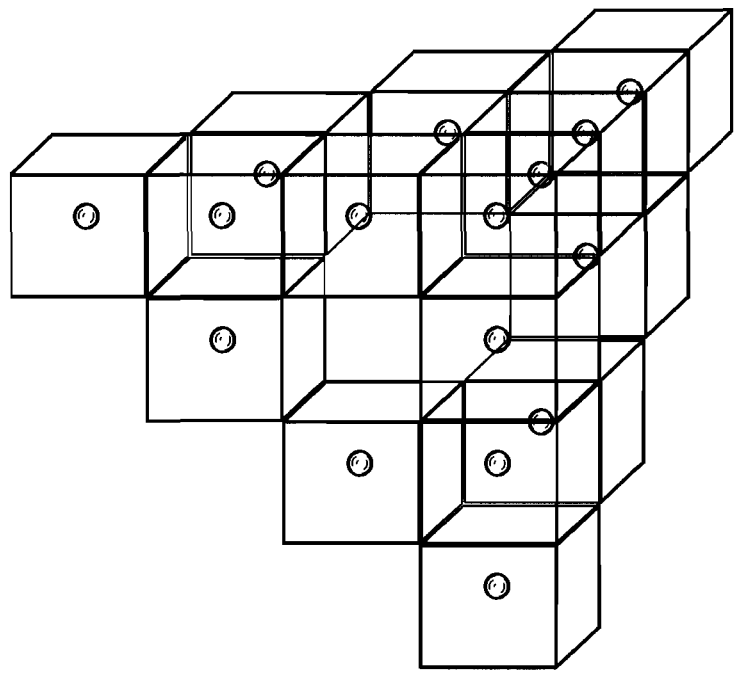
FIG. 5B is a drawing that is useful for understanding the concept of a level 2 fractal.

Once the level 1 fractals have been identified in step 206, the method continues on to step 208 for identifying level 2 fractals. Level 2 fractals are identified by scanning through the point cloud data at a second level of resolution. At the second level of resolution, the block 300 from FIG. 3 is scaled up in size so that each sub-volume $302_0$-$302_7$ will contain a block of voxels of size 2×2×2. This scenario is illustrated in FIG. 5A which shows a bock cube $300_2$, where each sub-volume contains eight (8) voxels. At the second level of resolution, sub-volumes $302_0$-$302_7$ which contain the same level 1 fractal pattern will be marked. For example, in FIG. 5A, it will be noted that sub-volumes $302_3$, $302_5$, $302_6$, and $302_7$ all contain level 1 fractals having the same three-dimensional shape and these sub-volumes are therefore marked. The marked sub-volumes at the second level of resolution can form 256 different three-dimensional geometric patterns.

When the marked ones of sub-volumes $302_0$-$302_7$ form a three-dimensional pattern in cube $300_2$ which is the same pattern as the level 1 fractals contained in the marked sub-volumes, then the three-dimensional geometric patterns at the second level of resolution is referred to herein as a level 2 fractal. A level 2 fractal corresponding to the example shown in FIG. 5A is illustrated FIG. 5B.

Figure 6:
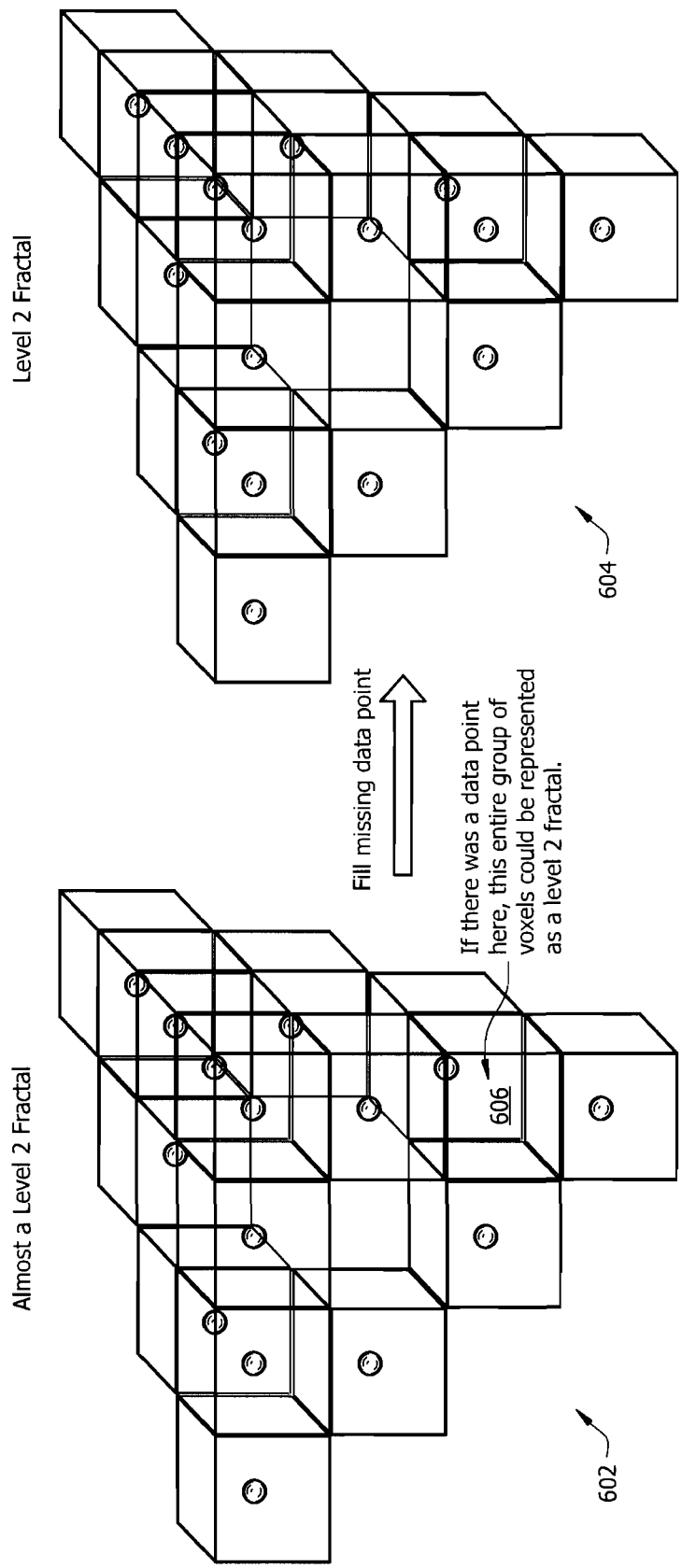
FIG. 6 is useful for understanding how fractals can be used to identify voids within point cloud data.

It will be appreciated that there may be many instances where the points within the point cloud can almost form a level 2 fractal, but fail to do so because of one or more missing data points. For example, this may occur when there are gaps or voids in the data. This scenario is illustrated in FIG. 6, which shows an arrangement of points 602 which almost form a level 2 fractal, but fail to do so because there is a point missing in one voxel (i.e., voxel 606 in this example). By adding the missing point in voxel 606, the pattern of points is completed so as to form a level 2 fractal 604. Adding the missing point can provide two benefits. One advantage is that the addition of the missing point allows for the entire group of points to be more efficiently represented, in this case as a level 2 fractal. Consequently, there is a data compression advantage that can be gained by point filling. More importantly, the existence of level 1 fractals having a common three dimensional pattern in several surrounding sub-volumes, and their near fit within a level 2 fractal, can serve as an indication that there is a data gap or void in voxel 600 which should be filled to more accurately represent the scene that was imaged. In this way, fractals can be used to identify voxels where a data point is not present, but nevertheless should be present. It will be appreciated that the example illustrated in FIG. 6 shows an arrangement of points 602 where only a void appears in only a single voxel, and where the addition or filling with only a single point is sufficient to form a level 2 fractal. However, it should be understood that other scenarios could require that more than one point must be filled in order to form a level 2 fractal from a group of level 1 fractals.

Referring once again to FIG. 2, the processing advantageously continues in step 210 with the identification of points within the point cloud data which could be level 2 fractals if certain voxels were filled. This step will generally involve setting some limitations with regard to the number of points that can be missing relative to the formation of a complete level 2 fractal. For example, step 210 can involve identification of point cloud data that is missing one point or multiple points to complete the formation of a level 2 fractal. An acceptable number of missing points can be pre-defined within a computer application, or can be selected by a program operator. Once such point cloud formations with missing points have been identified in step 210, the voxels can be selectively filled in step 212 with points as needed to form a level 2 fractal. The number of points that are filled will be determined by the predetermined acceptable number of missing points as described above.

The filling process as described herein will increase the number of level 2 fractals identified within the point cloud, while minimizing a fractal self similarity function. Basically, if there is a gap or void in the data, and the adjacent 3D areas within the point cloud have a certain level 1 fractal pattern, then it is likely that the data containing the gap should have the same pattern. Accordingly, the gap or void is filled to mimic this certain pattern if and only if there are fractal patterns of the same type at a lower resolution which include the candidate pattern in the detected gap. This filling approach has the further advantage that data in the neighborhood of the void can be compressed as a result of filling the void with that certain pattern corresponding to surrounding level 1 fractals.

Figure 7A:
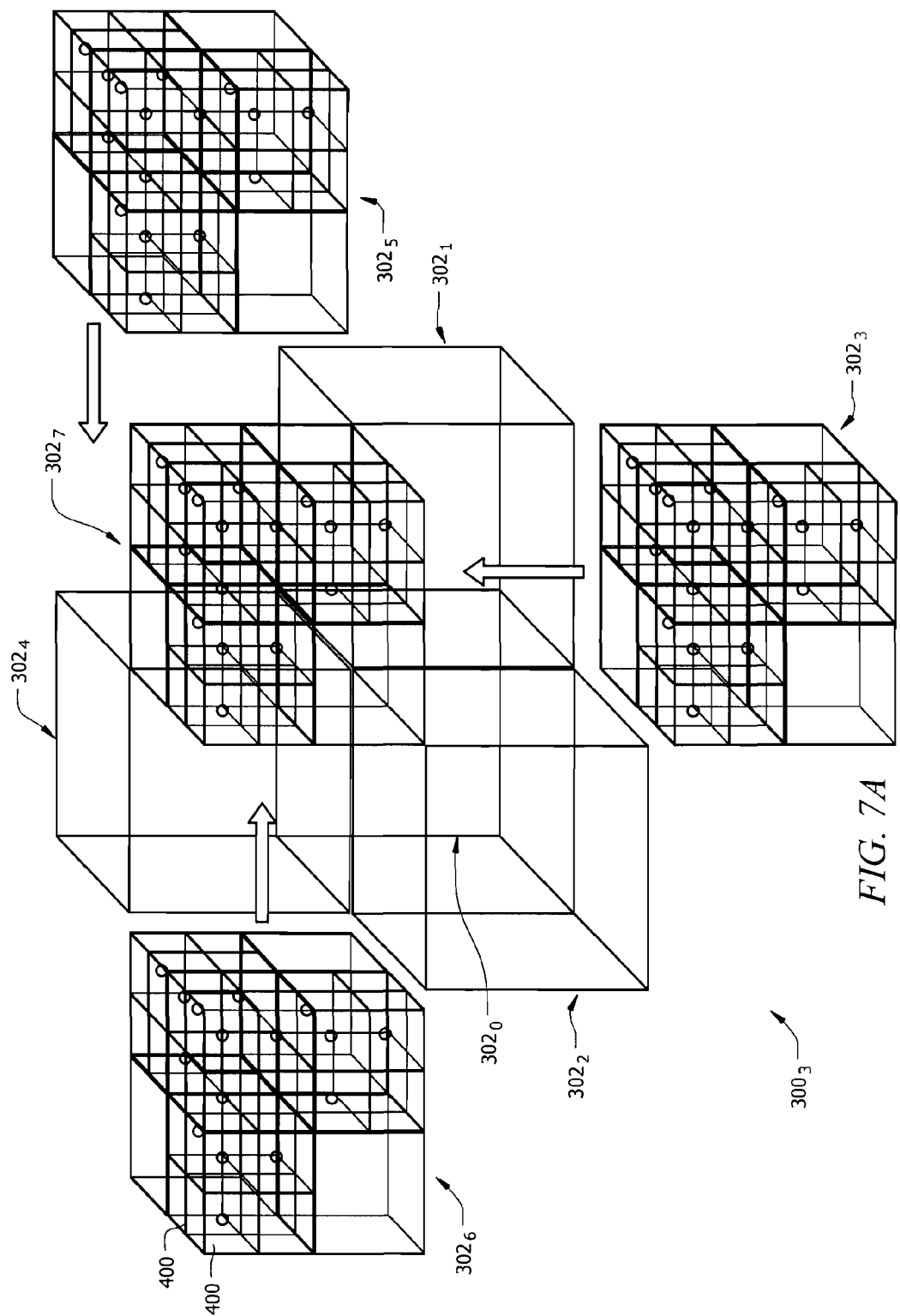
FIG. 7A is an exploded view of a drawing that is useful for understanding how the cube in FIG. 3 can be used for identifying certain geometric patterns at a third level of resolution.
Figure 7B:
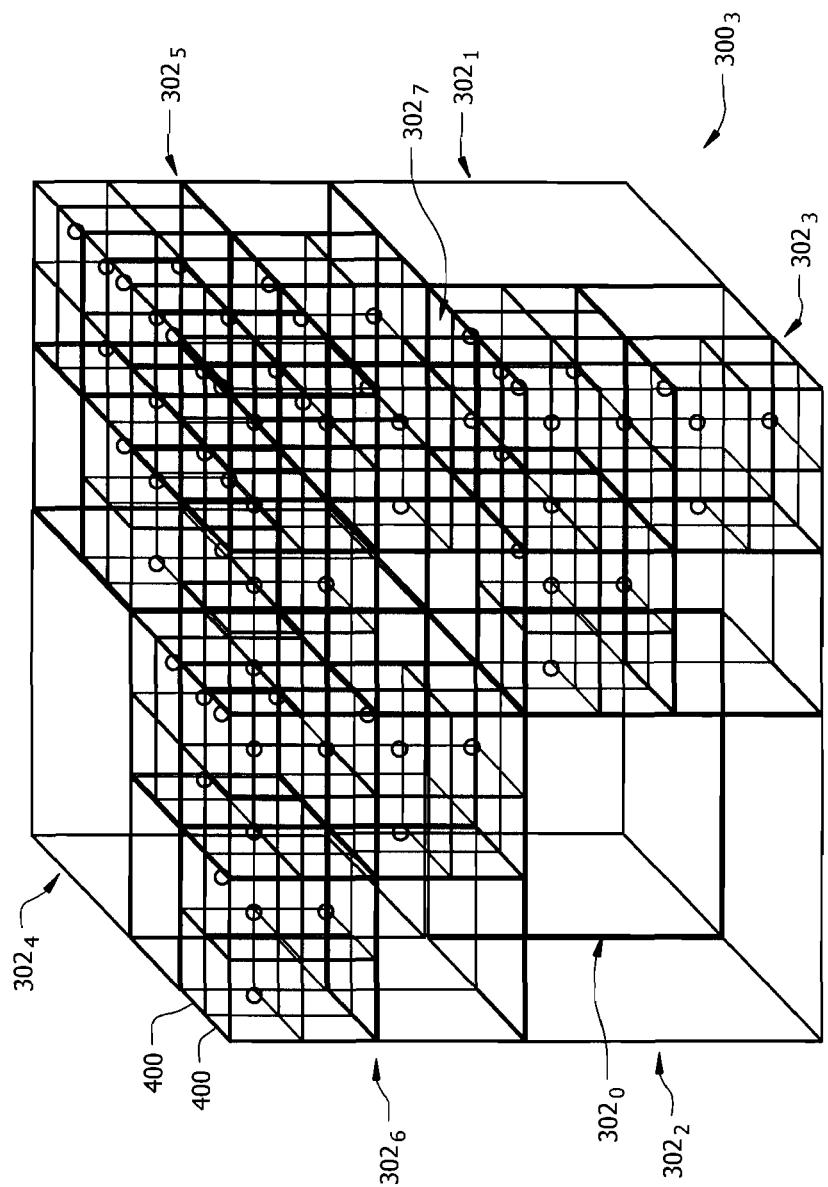
FIG. 7B is a non-exploded view of the drawing in FIG. 7 that is useful for understanding how the cube in FIG. 3 can be used for identifying certain geometric patterns at a third level of resolution.
Figure 7C:
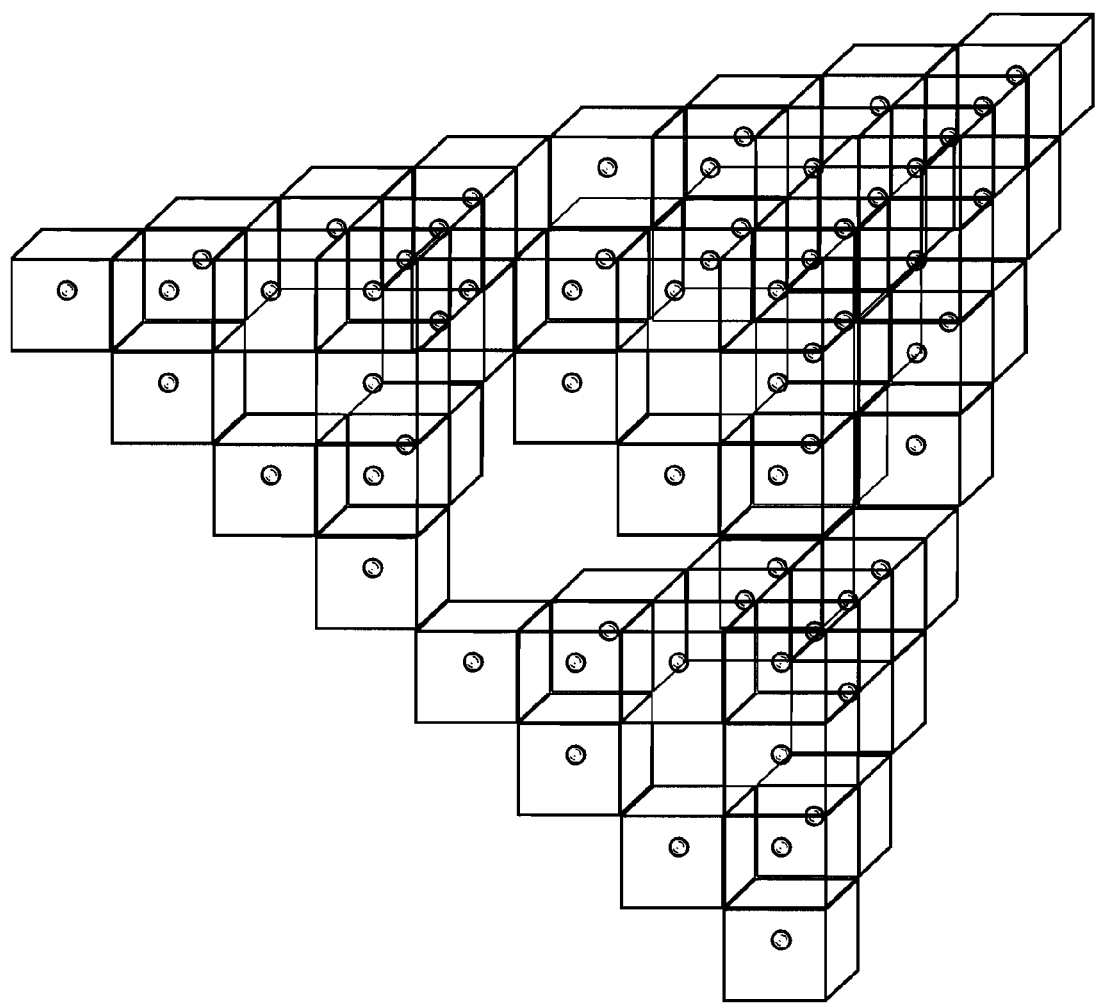
FIG. 7C is a drawing that is useful for understanding the concept of a level 3 fractal

The foregoing process can be extended to a third level of resolution in steps 214, 216 and 218. At step 214, the process can continue by identifying a plurality of level 3 fractals using a third level of resolution. At the third level of resolution, the block 300 from FIG. 3 is scaled up in size so that each sub-volume $302_0$-$302_7$ will contain a block of voxels of size 4×4×4. This scenario is illustrated in FIGS. 7A and 7B which shows a block cube $300_3$, where each sub-volume contains sixty-four (64) voxels. At the third level of resolution, sub-volumes $302_0$-$302_7$ will be marked only when they have a common level 2 fractal pattern contained therein. For example, in FIGS. 7A and 7B it will be noted that sub-volumes $302_3$, $302_5$, $302_6$, and $302_7$ all contain the same level 2 fractals and these sub-volumes are therefore marked. The marked sub-volumes at the third level of resolution can form 256 different three-dimensional geometric patterns. When the marked ones of sub-volumes $302_0$-$302_7$ form a three-dimensional pattern in cube $300_3$ which is the same pattern as the level 2 fractals contained in the marked sub-volumes, then the three-dimensional geometric patterns at the third level of resolution is referred to herein as a level 3 fractal. A level 3 fractal corresponding to the example shown in FIGS. 7A and 7B is illustrated FIG. 7C.

The processing advantageously continues in step 216 with the identification of points within the point cloud data which could be level 3 fractals if certain voxels were filled. This step will generally involve setting some limitations with regard to the number of points that can be missing relative to the formation of a complete level 3 fractal. For example, step 216 can involve identification of point cloud data that is missing one point or multiple points to complete the formation of a level 3 fractal. An acceptable number of missing points can be pre-defined within a computer application, or can be selected by a program operator. Once such point cloud formations with missing points have been identified in step 216, the voxels can be selectively filled in step 218 with points as needed to form a level 3 fractal. The number of points that are filled will be determined by the predetermined acceptable number of missing points as described above, while also ensuring that the fractal self similarity cost function is minimized.

The fractal self-similarity cost function can be represented as follows:

$$\text{CostFunction\_di } dj, dk = \sum_{i=-n}^{n} \sum_{j=-n,}^{n} \sum_{k=-n,}^{n} \min C(i, j, k)$$

Where C(i, j, k) is the number of fractal patterns in the compression format. The variables (i, j, and k) refer to latitude, longitude, and height values. The variable n refers to the window size or in this case the voxel dimension of the fractal level currently being processed. The cost function is used to measure the amount of compression that occurs from a reduced representation of patterns within patterns.

The filling process as described herein advantageously increases the number of level 3 fractals identified within the point cloud, while minimizing a fractal self similarity function. Basically, if there is a gap or void in the data, and the adjacent 3D areas within the point cloud have a certain level 2 fractal pattern, then it is likely that the data containing the gap or void should have the same level 2 fractal pattern. Accordingly, the gap or void is filled to mimic this certain pattern. In addition to filling voids in the data, this filling process has the further advantage that data in the neighborhood of the void can be compressed.

The three levels of resolution described herein are sufficient for understanding the invention. However, it should be understood that the invention can also use further levels of resolution to identify higher level fractals. Accordingly, step 220 can involve optionally identifying and filling points to generate higher level fractals while minimizing the fractal self-similarity function. Processing for such further levels of resolution would generally be similar to the processing in steps 214-216. All such embodiments are intended to be within the scope of the present invention.

Any suitable processing method can be used identify level 1, level 2 and level 3 fractals. According to one embodiment, the cube $300_1$, $300_2$, $300_3$ can be systematically scanned through the entire range of 3D point cloud data, and at each row and column position within the point cloud, the points contained within the cube can be evaluated to identify fractals at one level of resolution. Still, the invention is not limited in this regard and those skilled in the art will recognize that other processing methods could be devised for analyzing the 3D point cloud to identify fractals. Further, it should be understood that the invention is not limited to use of a cube 300 that has sub-volumes arranged in a 2×2×2 geometric pattern as shown. Other size cubes having different sub-volume configurations (e.g., an arrangement of 3×3×3 sub-volumes or 2×3×3 sub-volumes) can also be used without limitation.

Referring once again to FIG. 2, the process can continue at 222 by generating a lookup table (LUT) for the 3D point cloud data in which the data is compressed by using various levels of fractals to represent patterns of data. FIG. 9 is useful for understanding how such an LUT can be generated. In FIG. 9, Location Number reference positions for a cube 300 within a set of 3D point cloud data is listed in a first column identified as "Location No." Columns are also provided which list the X, Y and Z values associated with the reference positions listed in the Location No. column. These X, Y, and Z values define the positions of data points within the 3D point cloud data and in this example correspond to the latitude, longitude and height parameters associated with example 3D data for terrain. A column labeled Resolution Level 1 lists the Pattern Reference Number identified at each particular location.

Recall from the discussion of FIG. 8 that each Pattern Reference Number refers to one of 256 possible patterns that can be defined by cube 300. Accordingly, at Location No. 1, pattern reference number 171 has been identified at Resolution Level 1. At Location No. 2, pattern reference number 11 has been identified. At location No. 3, pattern no. 129 has been identified. Pattern reference numbers are not listed for Resolution Level 2 and Resolution Level 3 where a level 2 or level 3 fractal is not detected. Accordingly, these columns are left blank in the case of Location Nos. 1, 2 and 3. However, note that in the case of location no. 4, a level 3 fractal has been identified. Specifically, there is shown at location no. 4 a level 3 fractal corresponding to a pattern reference number 11. Accordingly, these 64 points can be represented in a LUT with a single entry which indicates that a level 3 fractal, with pattern no. 11 is located at the X, Y, and Z coordinates corresponding to location no. 4.

In some embodiments of the invention, it can be desirable to compress the point cloud data using only those three-dimensional geometric patterns that are relatively common with regard to their frequency of occurrence in real world terrain mapping. Also, it should be noted that the invention can also involve lossy approximations of 3D point cloud data by allowing fractals to be recognized in cases where the actual point cloud data does not perfectly match such a fractal. For example, this may occur when the point cloud data is one voxel off with respect to a perfect match. In such cases, a match could still be declared with a slight loss in data fidelity in return for a greater compression of data. In this regard, the system can also take into consideration the relative strength of a return associated with a particular point. If it is desired to assign an intensity value to a filled point, then the corresponding pattern's intensity values in a neighborhood may be averaged or otherwise mathematically combined. If a return has a low intensity, this may suggest that the data point is noise or has been corrupted in some way due to multipath or other effects in the data collection process.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The methods described herein can be implemented on a computer system. The computer system can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. Further, while a single computer is illustrated, the phrase "computer system" shall be understood to include any collection of computing devices that individually or jointly execute a set (or multiple sets) of instructions to perform any one or more of the methodologies discussed herein.

Figure 10:
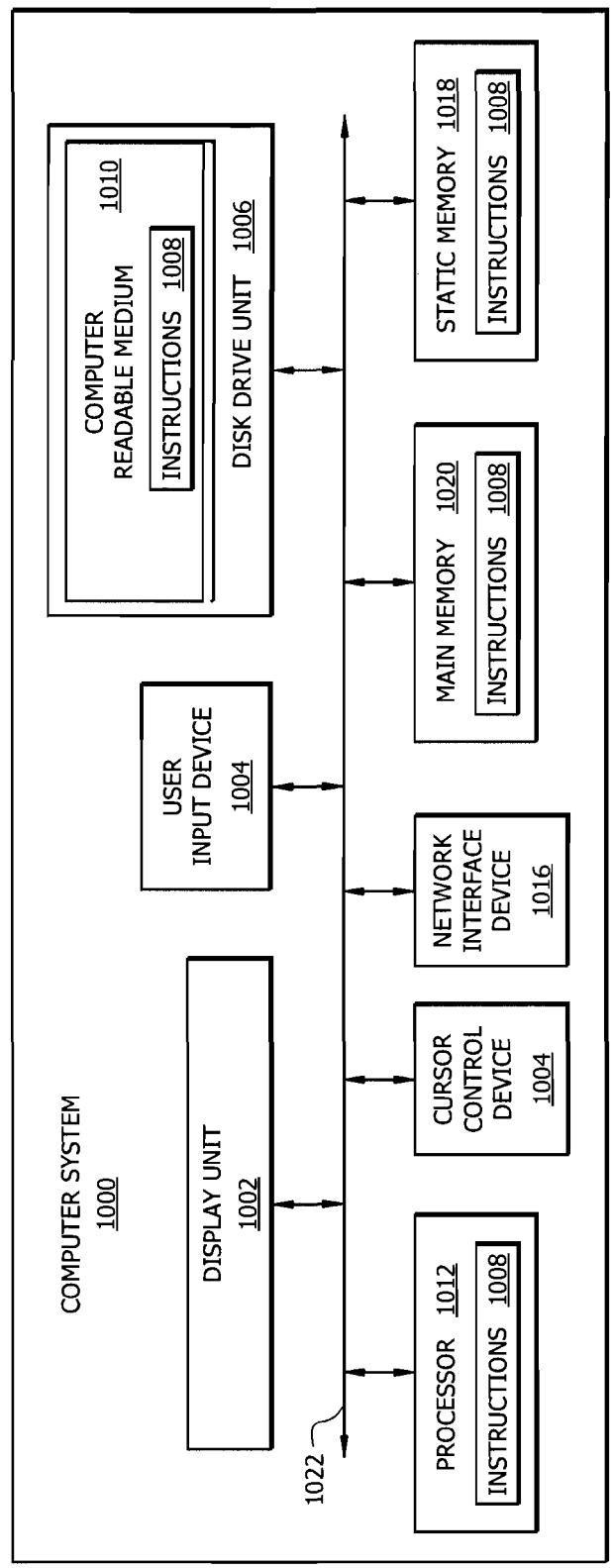
FIG. 10 is a block diagram of a computer system that can be used to implement the processing methods described herein.

Referring now to FIG. 10, a computer system 1000 includes a processor 1012 (such as a central processing unit (CPU), a graphics processing unit (GPU, or both), a disk drive unit 1006, a main memory 1020 and a static memory 1018, which communicate with each other via a bus 1022. The computer system 1000 can further include a display unit 1002, such as a video display (e.g., a liquid crystal display or LCD), a flat panel, a solid state display, or a cathode ray tube (CRT)). The computer system 1000 can include a user input device 1004 (e.g., a keyboard), a cursor control device 1014 (e.g., a mouse) and a network interface device 1016.

The disk drive unit 1006 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the main memory 1020, the static memory 1018, and/or within the processor 1012 during execution thereof by the computer system. The main memory 1020 and the processor 1012 also can constitute machine-readable media.

Those skilled in the art will appreciate that the computer system architecture illustrated in FIG. 10 is one possible example of a computer system. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 1016 connected to a network environment communicates over the network using the instructions 1008.

While the computer-readable storage medium 1010 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method of using a computer processor to improve the quality of a set of a three dimensional (3D) point cloud data representing a physical surface by detecting and filling null spaces, comprising:
analyzing the set of 3D point cloud data with said computer processor to identify within said set of 3D point cloud data the presence of a plurality of level 1 fractals, each level 1 fractal respectively defined by a first plurality of voxels, the first plurality of voxels containing data points arranged in a first three-dimensional pattern of a plurality of three-dimensional patterns; and
using said computer processor to selectively fill a second plurality of voxels in said 3D point cloud data with a first predetermined limited number of data points to increase a number of instances where level 2 fractals can be used for representing said 3D point cloud data, each level 2 fractal defined by a third plurality of voxels, said third plurality of voxels comprised of at least a portion of two or more of said level 1 fractals; and
wherein said two or more said level 1 fractals which form each level 2 fractal are also arranged in accordance with said first three dimensional pattern, whereby the three dimensional arrangement of the two or more level 1 fractals with respect to each other is the same as the three dimensional arrangement of the first plurality of voxels forming each level 1 fractal.

2. The method according to claim 1, further comprising reducing a file size required to represent said 3D point cloud data by using said computer processor to represent said data in a data store using information concerning said level 1 and level 2 fractals.

3. The method according to claim 1, further comprising storing in said memory information concerning said selectively filled voxels.

4. The method according to claim 1, further comprising:
selectively filling voxels in said 3D point cloud data with a second predetermined limited number of data points to increase a number of instances where level 3 fractals can be used for representing said 3D point cloud data, each level 3 fractal defined by a fourth plurality of voxels, said fourth plurality of voxels comprised of at least a portion of two or more of said level 2 fractals;
wherein said two or more level 2 fractals which form each level 3 fractal are also arranged in accordance with said first three dimensional pattern, whereby the three dimensional arrangement of the two or more level 2 fractals with respect to each other is the same as the three dimensional arrangement of the level 1 fractals plurality of forming each level 2 fractal.

5. A method of using a computer processor to improve the quality of a set of a three dimensional (3D) point cloud data representing a physical surface by detecting and filling null spaces, comprising:
analyzing with said computer processor the set of 3D point cloud data to identify within said set of 3D point cloud data the presence of a plurality of level 1 fractals, each level 1 fractal respectively defined by a first plurality of voxels, the first plurality of voxels containing data points arranged in a first three dimensional pattern of a plurality of three-dimensional patterns;
analyzing with said computer processor the set of 3D point cloud data to identify within said set of 3D point cloud data the presence of a plurality of level 2 fractals, each level 2 fractal defined by a second plurality of voxels, said second plurality of voxels comprised of at least a portion of two or more of said level 1 fractals, wherein said two or more level 1 fractals which form each level 2 fractal are also arranged in accordance with said first three dimensional pattern, whereby the three dimensional arrangement of the two or more level 1 fractals with respect to each other is the same as the three dimensional arrangement of the first plurality of voxels forming each level 1 fractal; and using said computer processor to selectively fill a third plurality of voxels in said 3D point cloud data with a first predetermined limited number of data points to increase a number of instances where said level 2 fractals can be used for representing said 3D point cloud data, and wherein a fractal self-similarity cost function is minimized.

6. The method according to claim 5, wherein said fractal self-similarity cost function is minimized when a total number of fractal patterns needed to represent the 3D point cloud data is minimized.

7. The method according to claim 5, further comprising analyzing the set of 3D point cloud data with said computer processor to identify within said set of 3D point cloud data the presence of a plurality of level 3 fractals, each level 3 fractal defined by a fourth plurality of voxels, said fourth plurality of voxels comprised of at least a portion of two or more level 2 fractals; and wherein said two or more level 2 fractals which form each level 3 fractal are also arranged in accordance with said first three dimensional pattern, whereby the three dimensional arrangement of the two or more level 2 fractals with respect to each other is the same of the three dimensional arrangement of the plurality of level 1 fractals forming each level 2 fractal.

8. The method according to claim 7, further comprising using said computer processor to selectively fill voxels in said 3D point cloud data with a second predetermined limited number of data points to increase a number of instances where said level 3 fractals can be used for representing said 3D point cloud data and wherein a fractal self-similarity cost function is minimized.

9. The method according to claim 7, further comprising reducing a file size required to represent said 3D point cloud data by representing said data in a data store using information concerning said level 1, level 2 and level 3 fractals.

10. The method according to claim 5, further comprising storing in said memory information concerning said selectively filled voxels.

11. A non-transitory computer-usable storage medium having stored thereon sequences of instructions that, when executed by a machine, cause the machine to perform actions which improve the quality of a set of a three dimensional (3D) point cloud data representing a physical surface by detecting and filling null spaces, the actions comprising:

analyzing the set of 3D point cloud data with said computer processor to identify within said set of 3D point cloud data the presence of a plurality of level 1 fractals, each level 1 fractal defined by a first plurality of voxels containing data points arranged in a first three dimensional pattern of a plurality of three-dimensional patterns; and using said computer processor to selectively fill a second plurality of voxels in said 3D point cloud data with a first predetermined limited number of data points to increase a number of instances where level 2 fractals can be used for representing said 3D point cloud data, each level 2 fractal defined by a third plurality of voxels, said third plurality of voxels comprised of at least a portion of two or more level 1 fractals; and wherein said two or more level 1 fractals which form each level 2 fractal are also arranged in accordance with said first three dimensional pattern, whereby the three-dimensional arrangement of the two or more level 1 fractals with respect to each other is the same as the three dimensional arrangement of the first plurality of voxels forming each level 1 fractal.

12. The non-transitory computer-usable storage medium according to claim 11, wherein said actions further comprise reducing a file size required to represent said 3D point cloud data by using said computer processor to represent said data in a data store using information concerning said level 1 and level 2 fractals.

13. The non-transitory computer-usable storage medium according to claim 11, wherein said actions further comprising storing in said memory information concerning said selectively filled voxels.

14. The non-transitory computer-usable storage medium according to claim 11, wherein said actions further comprise:

selectively filling voxels in said 3D point cloud data with a second predetermined limited number of data points to increase a number of instances where level 3 fractals can be used for representing said 3D point cloud data, each level 3 fractal defined by a fourth plurality of voxels, said fourth plurality of voxels comprised of at least a portion of two or more of said level 2 fractals; and wherein said two or more level 2 fractals which form each level 3 fractal are also arranged in accordance with said first three dimensional pattern, whereby the three dimensional arrangement of the two or more level 2 fractals with respect to each other is the same as the three dimensional arrangement of the plurality of level 1 fractals forming each level 2 fractal.

15. A non-transitory computer-usable storage medium having stored thereon sequences of instructions that, when executed by a machine, cause the machine to perform actions which improve the quality of a set of a three dimensional (3D) point cloud data representing a physical surface by detecting and filling null spaces, the actions comprising:

analyzing with said computer processor the set of 3D point cloud data to identify within said set of 3D point cloud data the presence of a plurality of level 1 fractals, each level 1 fractal respectively defined by a first plurality of voxels containing data points arranged in a first three dimensional pattern of a plurality of three-dimensional patterns;

analyzing with said computer processor the set of 3D point cloud data to identify within said set of 3D point cloud data the presence of a plurality of level 2 fractals, each level 2 fractal defined by a second plurality of voxels, the second plurality of voxels comprised of at least a portion of two or more of said level 1 fractals, wherein said two or more level 1 fractals which form each level 2 fractal are also arranged in accordance with said first three dimensional pattern, whereby the three dimensional arrangement of the two or more level 1 fractals with respect to each other is the same as the three dimensional arrangement of the first plurality of voxels forming each level 1 fractal; and using said computer processor to selectively fill a third plurality of voxels in said 3D point cloud data with a first predetermined limited number of data points to increase a number of instances where said level 2 fractals can be used for representing said 3D point cloud data, and wherein a fractal self-similarity cost function is minimized.

16. The non-transitory computer-usable storage medium according to claim 15, wherein said fractal self-similarity cost function is minimized when a total number of fractal patterns needed to represent the 3D point cloud data is minimized.

17. The non-transitory computer-usable storage medium according to claim 15, wherein said actions further comprise analyzing the set of 3D point cloud data with said computer processor to identify within said set the presence of a plurality of level 3 fractals, each level 3 fractal defined by a fourth plurality of voxels, said fourth plurality of voxels comprised of at least a portion of two or more of said level 2 fractals, said two or more level 2 fractals which form each level 2 fractal are also arranged in accordance with said first three dimensional pattern, whereby the three dimensional arrangement of the two or more level 2 fractals with respect to each other is the same as the three dimensional arrangement of the plurality of level 1 fractals forming each level 2 fractal.

18. The non-transitory computer-usable storage medium according to claim 17, wherein said actions further comprise using said computer processor to selectively fill voxels in said 3D point cloud data with a second predetermined limited number of data points to increase a number of instances where said level 3 fractals can be used for representing said 3D point cloud data and wherein a fractal self-similarity cost function is minimized.

19. The non-transitory computer-usable storage medium according to claim 17, wherein said actions further comprise reducing a file size required to represent said 3D point cloud data by representing said data in a data store using information concerning said level 1, level 2 and level 3 fractals.

20. The non-transitory computer-usable storage medium according to claim 15, wherein said actions further comprise storing in said memory information concerning said selectively filled voxels.

* * * * *